United States Patent [19]
Ikeda
[11] Patent Number: 4,701,771
[45] Date of Patent: Oct. 20, 1987

[54] INK JET RECORDER HAVING AN INK ACCEPTOR WITH AN INK ABSORBER PROVIDED THEREIN

[75] Inventor: Kunihiko Ikeda, Kodaira, Japan

[73] Assignee: Canon Kabushiki Kaisha, Tokyo, Japan

[21] Appl. No.: 757,507

[22] Filed: Jul. 22, 1985

[30] Foreign Application Priority Data

Jul. 30, 1984 [JP] Japan ............................... 59-159920

[51] Int. Cl.[4] ............................................ G01D 18/00

[52] U.S. Cl. ................................ 346/140 R; 250/577; 340/604

[58] Field of Search .................. 346/140, 75; 400/126; 250/577; 356/436, 445; 340/607, 604

[56] References Cited

U.S. PATENT DOCUMENTS

| | | | |
|---|---|---|---|
| 3,761,953 | 9/1973 | Helgeson | 346/75 |
| 4,328,504 | 5/1982 | Weber | 346/140 X |
| 4,364,055 | 12/1982 | Aiba | 346/78 X |
| 4,369,456 | 1/1983 | Cruz-Uribe | 346/140 |
| 4,437,105 | 3/1984 | Mrazek | 346/140 |
| 4,493,993 | 1/1985 | Kanamuller | 346/140 X |

*Primary Examiner*—Joseph W. Hartary
*Attorney, Agent, or Firm*—Fitzpatrick, Cella, Harper & Scinto

[57] ABSTRACT

An ink jet recorder includes an ink acceptor having an ink absorber arranged to face an ink jet head, and a detector for detecting the degree of absorption ability of the ink absorber. When the detector detects the loss of absorption ability of the ink absorber, it issues an alarm signal.

32 Claims, 9 Drawing Figures

INK JET RECORDER HAVING AN INK ACCEPTOR WITH AN INK ABSORBER PROVIDED THEREIN

BACKGROUND OF THE INVENTION

1. Field of the Invention

The present invention relates to an ink jet recorder, and more particularly to an ink jet recorder having a droplet acceptor which is used in a recording head discharge test or discharge recovery (test discharge) or when an orifice or surrounding elements are cleaned.

2. Description of the Prior Art

An ink jet recording system has a number of advantages such as high recording speed, plain paper printing without fixing, facility for color printing and low noise.

However, since the flying droplets used for recording are formed by discharging the liquid from a fine discharge orifice, the discharging orifice is clogged by deposition of the liquid as the liquid is evaporated when the recorder is left unused for a long time, and the liquid is not well discharged. Further, paper particles may be deposited in or around the discharge orifice or gas may remain in the recording head. In such cases, the liquid is also not well discharged. In addition, the evaporation of the liquid usually leads to an increase of viscosity, which also causes improper discharge of the liquid.

In order to allow proper recording or checking whether normal recording can be performed, the liquid is discharged from the discharge orifice for test purposes. Such discharging of the liquid is done not to a record medium but to droplet acceptor which includes an absorber.

In the prior art ink jet recorder, a porous material such as sponge or a textile material such as felt is used as an absorber of the droplet acceptor for the test discharging or the like, and an operator substitutes a new absorber for a saturated absorber from time to time.

In prior art ink jet recorders, however, since the ink is always accepted at the same portion of the absorber, that portion is rapidly saturated by the ink. As the ink is dried and solidified, the absorption ability of the absorber decreases and the ink discharged during the test discharging is not fully absorbed but falls into the recorder and contaminates the recorder. As a result, the hands of the operator are also contaminated or the ink deposits on a path of the record medium or the recording head and hence the record paper is contaminated.

SUMMARY OF THE INVENTION

It is an object of the present invention to provide an ink jet recorder which detects the contamination of an absorber of a ink droplet acceptor so that the contamination in the recorder due to the discharged ink is prevented.

It is another object of the present invention to provide an ink jet recorder having an ink droplet acceptor arranged to face an ink jet head and having an absorber for absorbing the ink, and detection means for detecting a degree of absorption ability of the absorber.

DETAILED DESCRIPTION OF THE PREFERRED EMBODIMENTS

Figure 1:
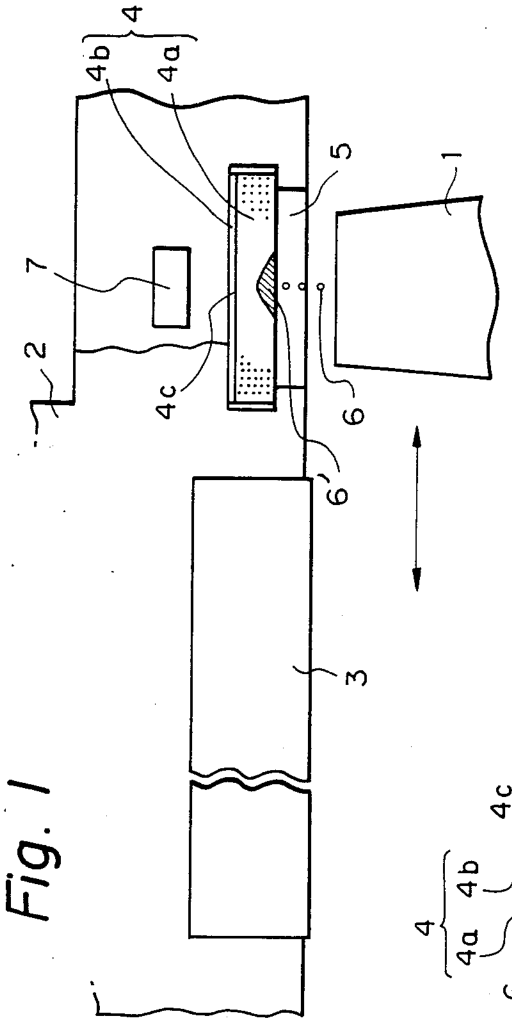
FIGS. 1 and 2*a* are a plan view and a side elevational view of a first embodiment of an ink jet recorder of the present invention.
Figure 2B:
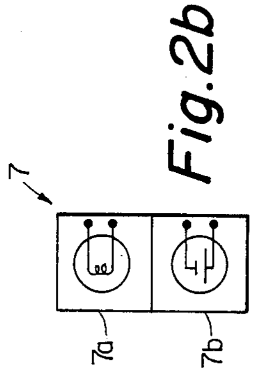
FIG. 2*b* shows details of the sensor shown in FIG. 2*a*
Figure 2A:
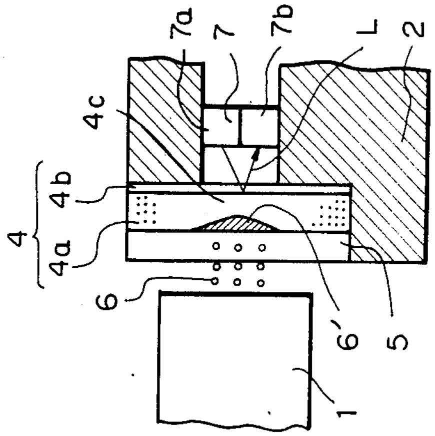

FIGS. 1 and 2 show one embodiment of the present invention. A recording head 1 is reciprocally moved along a record paper 3 loaded to a recorder main unit 2 in a direction of an arrow to print characters.

In the ink jet recorder, a diameter of the ink discharge orifice of the recording head is very small, for example, 60 μm and hence clogging by dust in the air is a serious problem. Such clogging frequently occurs when the recorder is left unused for a long time. When power to the recorder is turned on to start printing, the ink is discharged when the recording head 1 is stopped at a home position at the time of power-on in order to clean the discharge orifice and check the discharge of the ink, and if the discharging is normal, the print operation is started. Accordingly, a vessel and a member for accepting the test discharge ink are arranged adjacent to the record paper 3.

A droplet acceptor 4 shown in FIG. 1 as an embodiment of an ink acceptor comprises a sponge or felt absorber 4*a* and a member 4*b* bonded thereto to impart regidity to the absorber 4*a* to facilitate handling when it is removed or attached. The droplet acceptor 4 is removably attached to an acceptor housing 5 of the main unit 2 so that an operator can exchange it when the absorber 4*a* loses its absorption ability.

The test discharge is carried out when the head 1 is at the home position, for example, as shown in FIG. 1. Accordingly, the droplets 6 are always discharged to a portion of the droplet acceptor which corresponds to the home position, and that portion is rapidly contaminated by the ink. As the ink is dries and solidifies, the ink absorption ability of that portion is lost and the discharged droplets are not absorbed but drop down in to the main unit. It is desirable to exchange the acceptor 4 after a predetermined number of times of printing operations (for example, 800,000 times), but if it is not done, the ink will contaminate the path of the record paper in the recorder or the recording head. This leads to the contamination of the record paper. It is very troublesome to clean the recorder in order to remove the contamination by the ink.

In the present invention, a sensor 7, for sensing the contamination of the acceptor 4 with ink, is arranged on the side of the acceptor opposite to the side facing the head 1. In the present embodiment, the sensor 7 comprises a light emitting element 7*a* such as lamp or light emitting diode and a photo-sensing element 7*b* such as photo-diode or photo-transistor, and they are arranged on the same side of the acceptor 4 to form a reflection type sensor. The light emitting means may be an external light. The absorber 4*a* of the droplet acceptor 4 is a white or light color porous material such as sponge or textile material such as felt and the member 4*b* is a transparent film member. When the porous material is of a complementary color to the ink used, the contamination of the material can be effectively visually observed.

When the absorber 4*a* of the droplet acceptor 4 has not yet been contaminated by the ink, that is, when the ink has not penetrated to a position 4*c* of the acceptor 4 which is sensed by the sensor 7, the light L is reflected at the position 4*c* and the sensor 7 is kept in an on-state. On the other hand, as the ink penetrates to contaminate the position 4*c* and the density at the position 4*c* reaches a predetermined level, the light is not reflected and the sensor 7 is turned off. In this manner, the saturation of the ink in the acceptor 4 is detected.

Light emitting means such as light emitting diode, neon discharge lamp or lamp, display means such as liquid crystal display or plasma display, or sound means such as buzzer, which responds to the signal from the sensor 7 is provided to instruct the exchange of the acceptor so that the operator is informed of the need of exchange. The operator may exchange the acceptor 4 in response to such instruction.

Figure 2C:
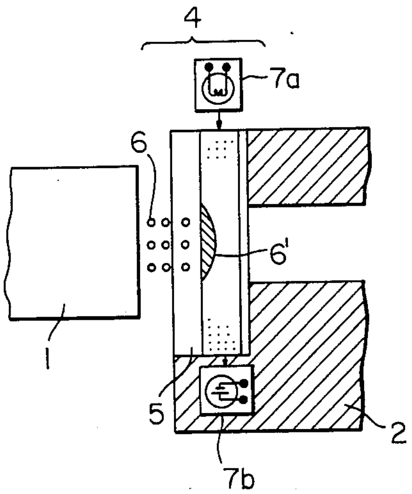
FIGS. 2*c* shows an alternate sensor arrangement.

With reference to FIG. 2*c*, it will bee seen that the sensor 7 need not be the reflection type sensor but it may be a transmission type sensor (which senses an intensity of light transmitted through the droplet acceptor). A light emitting element 7*a* is positioned on a side of acceptor 4 opposite from photosensor element 7*b*. The reflection type sensor is preferable from the view points of ink density, ink absorption, and the amount of light transmitted through the absorber.

The present invention is applicable to various types of droplet acceptors.

Figure 4:
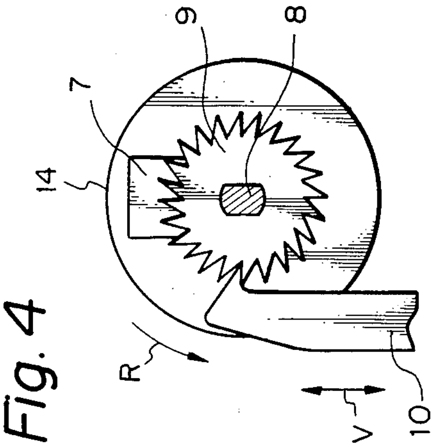
FIGS. 3 and 4 are plan view and side elevational view of a second embodiment of the ink jet recorder of the present invention.
Figure 3:
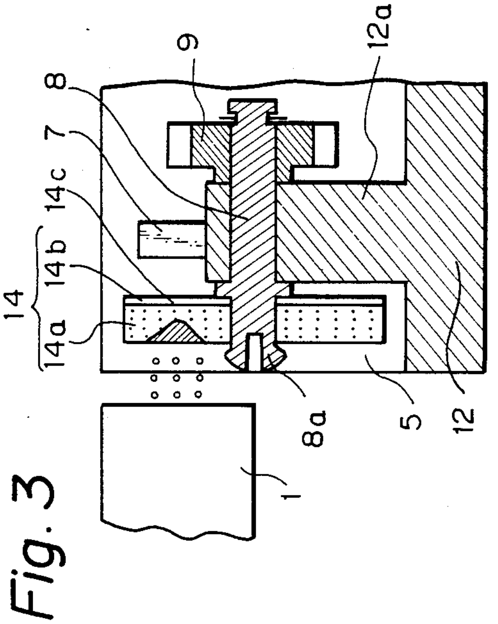

FIGS. 3 and 4 show another embodiment of the present invention. In the present embodiment, the droplet acceptor 14 is of disk shape and it comprises a white sponge or felt absorber 14*a* and a transparent film member 14*b*. The sensor 7 is arranged on the back of the droplet acceptor 14 to face the head home position.

The droplet acceptor 14 is removably attached to a shaft 8 which is rotatably supported by a bearing 12*a* on a retainer 12. An end 8*a* of the shaft 8 is slotted and spread so that the acceptor 14 is attached and removed by pushing or pulling it and the acceptor 14 is retained in position. The shaft 8 is rotated in a direction R by reciprocal movement, in a direction V, of a feed click 10 which meshes with a ratchet wheel 9.

When the sensor 7 produces a signal indicating that the portion 14*c* of the acceptor 14 which faces the sensor 7 has been contaminated, the feed click 10 is driven by drive means such as a solenoid so that the ratchet wheel 9 is rotated and the acceptor 14 is rotated through the shaft 8. When contamination of the acceptor 14 with ink at the position which is sensed by the sensor 7 decreases, the sensor 7 to be turned on, and the drive of the feed click 10 is stopped. Thus, a portion having absorption ability can always be positioned to face the head home position. In the present embodiment, when the entire area of the acceptor 14 has been contaminated and the sensor 7 is turned off, the instruction to exchange the acceptor 14 is issued to the operator by an alarm means such as lamp or buzzer.

Figure 5A:
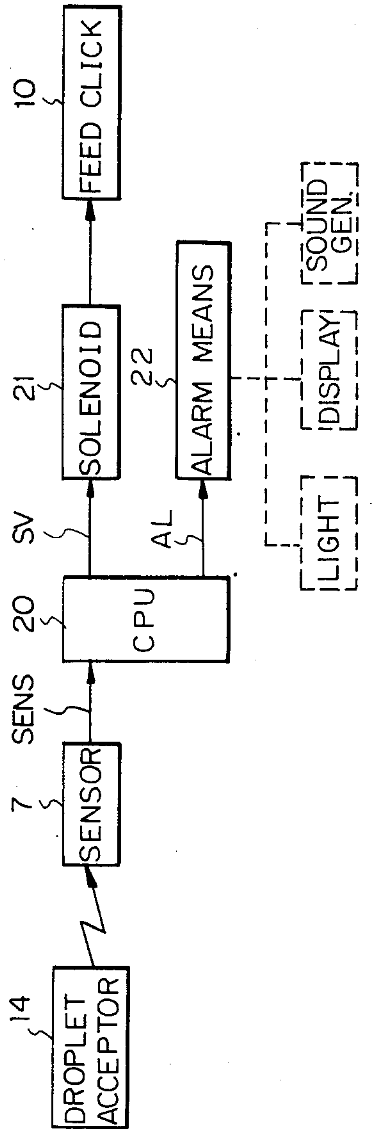
FIGS. 5*a* and 6 are block diagram and control flow chart respectively, of a control circuit used in the second embodiment.

FIG. 5*a* shows an embodiment of a control circuit for driving the droplet acceptor and instructing the exchange thereof. Numeral 20 denotes a CPU, numeral 21 denotes a solenoid for driving the feed click 10, numeral 22 denotes an alarm means such as lamp or buzzer, SENS denotes an output signal of the sensor 7, SV denotes a drive signal from the CPU 20 to the solenoid 21, and AL denotes an alarm signal to the alarm means 22. The alarm means may be one or more of a light, display or sound generator.

Figure 6:
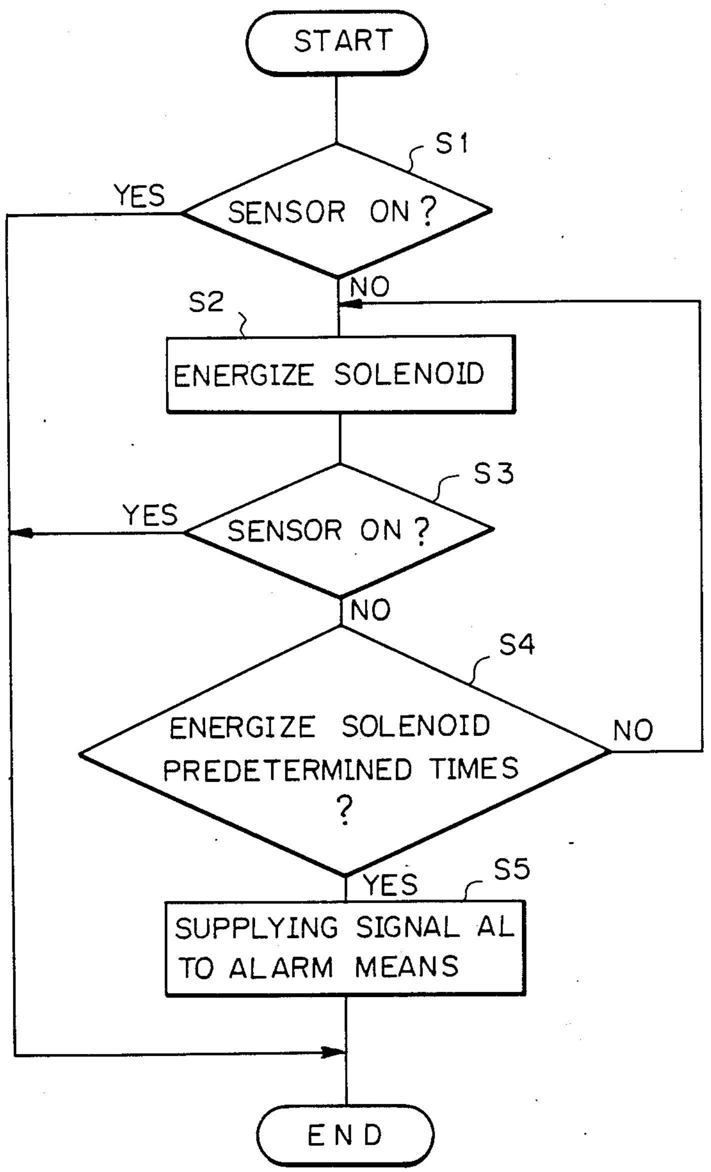

FIG. 6 shows the processing within the CPU 20. In step S1, the status of the sensor 7 is checked. If it is off, that is, if the contamination of the droplet acceptor 14 is detected, the CPU 20 drives the solenoid 21 in step S2 to rotate the droplet acceptor 14 by a small angle through the feed click 10. In step S3, the status of the sensor 7 is again checked. If it is off, whether the solenoid 21 has been driven by a predetermined number of times or not is checked in step S4. If the decision is NO, it means that a clean portion remains in the absorber of acceptor and the step S2 is repeated. On the other hand, if the decision is YES, it means that the sensor output is off after the predetermined number of times of drive of the solenoid and hence the entire area of the acceptor 14 has been contaminated. Thus, in step S5, the operator is informed of the situation by alarm means 22.

If the on-state of the sensor is detected in step S1 or S3, the process is terminated and the test discharge of the ink is effected.

In the above embodiments, the ink jet recorder which scans the record plane was described, although the present invention is applicable to an ink jet recorder in which the record paper is moved to record the image and droplet acceptor is moved to face the head in the test discharge mode.

The present invention is applicable to not only the ink absorption in the test discharge mode but also to the cleaning of the recording head by abutting the droplet acceptor to the orifice of the recording head to absorb unnecessary ink.

The droplet acceptor may be of rotation type as described above or of shift type (laterally or vertically). The rotation or shift increment may be preset and the droplet acceptor is rotated or shifted by the predetermined increment in response to a signal from a photosensor. The number of times of increments is counted, and when it reaches a predetermined count, the alarm means is activated to inform the contamination of the droplet acceptor.

Figure 5B:
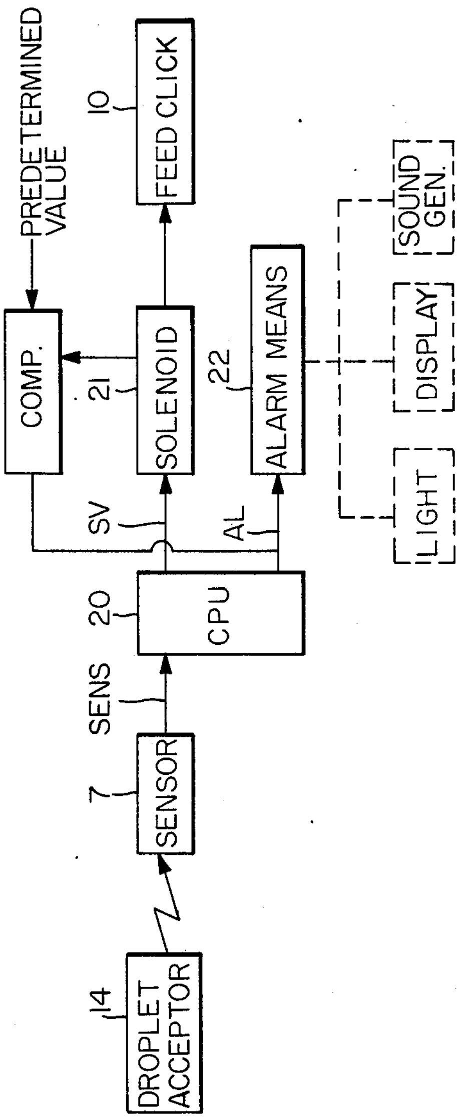
FIG. 5*b* is a block diagram of another embodiment of the invention.

FIG. 5*b* shows an embodiment of the invention which employs a comparator 31 for comparing the number of operations of solenoid 21 with a predetermined number for activating alarm 22.

Alternatively, if the rotation of 360 degree is not employed, a start position and an end position of the droplet acceptor may be preset so that the exhaustion of the entire area of the droplet acceptor is detected. The start position and the end position can be detected by a microswitch or the like if the droplet acceptor is moved in one direction.

Member 4*b* is not necessary if the porous material has the requisite rigidity, but it is preferable to cover the portions of the porous material other than the surface facing the head, from the viewpoints of easiness of mounting and removal, and contamination of fingers and hands of the operator. Generally the member 4*b* is preferably transparent although light transmissive material i.e., translucent may be used. Only the portion of the member 4*b* which faces the sensor may be of transparent material.

In accordance with the present invention, means for detecting the absorption ability of the absorber of the droplet acceptor which accepts the droplets discharged in the test discharge mode is provided. Accordingly, the contamination of the recorder due to the leakage of the discharged ink is prevented.

What is claimed is:

1. An ink jet recorder comprising:

an ink jet head having at least one orifice for emitting ink, a portion of which is not required for printing and constitutes waste ink;

ink acceptor means having a disposable ink absorber arranged to face said ink jet head for accepting waste ink discharged from the orifice of said ink jet head; and detection means for detecting a degree of absorption ability of said ink absorber and for providing a signal indicating when the absorber should be replaced.

2. An ink jet recorder according to claim 1, further comprising alarm means, responsive to said detection means, for issuing an alarm in response to a detection indicating a loss of absorption ability of said ink absorber.

3. An ink jet recorder according to claim 2 wherein said alarm means is light emitting means.

4. An ink jet recorder according to claim 2 wherein said alarm means is sound generating means.

5. An ink jet recorder according to claim 2 wherein said alarm means is display means.

6. An ink jet recorder according to claim 5 wherein said display means is liquid crystal display or plasma display.

7. An ink jet recorder according to claim 1 wherein said detection means includes photo-sensing means.

8. An ink jet recorder according to claim 7 wherein said photo-sensing means is a photo-diode or a phototransistor.

9. An ink jet recorder according to claim 7 wherein said detection means includes light emitting means.

10. An ink jet recorder according to claim 9 wherein said light emitting means is a lamp, light emitting diode or neon discharge lamp.

11. An ink jet recorder according to claim 9 wherein said photo-sensing means and said light emitting means are arranged on the same side of said ink acceptor means.

12. An ink jet recorder according to claim 9 wherein said photo-sensing means and said light emitting means are arranged on the opposite sides of said ink acceptor means.

13. An ink jet recorder according to claim 1 wherein said absorber is a porous material.

14. An ink jet recorder according to claim 13 wherein said porous material is of white or light color.

15. An ink jet recorder according to claim 13 wherein said porous material is of complementary color to the ink.

16. An ink jet recorder according to claim 1 wherein said ink acceptor means includes the absorber and a member covering the absorber.

17. An ink jet recorder according to claim 16 wherein at least a portion of said member facing said detection means is made of a light transmissive material.

18. An ink jet recorder according to claim 1 further comprising a shaft adapted to be fitted to a hole formed in said ink acceptor means.

19. An ink jet recorder according to claim 18 wherein said shaft is slotted at an end and the slotted end has a larger diameter than a diameter of said hole.

20. An ink jet recorder according to claim 18 wherein said hole is polygonal.

21. An ink jet recorder comprising:

an ink jet head;

ink acceptor means having an ink absorber arranged to face said ink jet head; and detection means for detecting a degree of absorption ability of said ink absorber, wherein said ink acceptor means includes drive means for moving said ink acceptor means in accordance with an output from said detection means.

22. An ink jet recorder according to claim 21 wherein said drive means includes a solenoid for driving a feed click and a ratchet wheel meshed with said feed click.

23. An ink jet recorder according to claim 21 wherein a distance of movement is preset.

24. An ink jet recorder according to claim 23 further comprising means for storing a total distance of movement.

25. An ink jet recorder according to claim 24 further comprising compare means for comparing the total distance of movement with a preset value.

26. An ink jet recorder according to claim 25 further comprising alarm means for alarming the loss of the absorption ability in accordance with the compare result of said compare means.

27. An ink jet recorder according to claim 26 wherein said alarm means is light emitting means.

28. An ink jet recorder according to claim 27 wherein said light emitting means is a light emitting diode, neon discharge lamp or lamp.

29. An ink jet recorder according to claim 26 wherein said alarm means is sound generating means.

30. An ink jet recorder according to claim 26 wherein said alarm means is display means.

31. An ink jet recorder according to claim 30 wherein said display means is liquid crystal display or plasma display.

32. An ink jet recorder comprising:

an ink jet head;

ink acceptor means having an ink absorber arranged to face said ink jet head, said ink acceptor means being disk shaped with a mount hole being formed therein; and detection means for detecting a degree of absorption ability of said ink absorber, said ink acceptor means including drive means for moving said ink acceptor means in accordance with an output from said detection means, and said ink acceptor means further including a ratchet wheel adapted to be driven in accordance with an output from said detection means.

* * * * *

UNITED STATES PATENT AND TRADEMARK OFFICE
CERTIFICATE OF CORRECTION

PATENT NO. : 4,701,771

DATED : October 20, 1987

INVENTOR(S) : KUNIHIKO IKEDA

It is certified that error appears in the above-identified patent and that said Letters Patent is hereby corrected as shown below:

COLUMN 1

Line 32, "to droplet" should read --to a droplet--.
Line 64, "2a are" should read --2a, respectively, are--.
Line 67, "FIG. 2a" should read --FIG. 2a,--.
Line 68, "FIGS. 2c" should read --FIG. 2c--.

COLUMN 2

Line 5, "chart respectively," should read --chart, respectively,--.
Line 6, "embodiment." should read --embodiment,--.
Line 42, "is" should be deleted.
Line 44, "in to" should read --into--.

COLUMN 3

Line 19, "bee" should read --be--.
Line 25, "view" should read --view- --.

UNITED STATES PATENT AND TRADEMARK OFFICE

CERTIFICATE OF CORRECTION

PATENT NO. : 4,701,771

DATED : October 20, 1987

INVENTOR(S) : KUNIHIKO IKEDA

It is certified that error appears in the above-identified patent and that said Letters Patent is hereby corrected as shown below:

COLUMN 4

Line 11, "acceptor and the step" should read --the acceptor and step--.
Line 24, "and droplet" should read --and the droplet--.
Line 44, "degree" should read --degrees--.
Line 56, "Generally" should read --Generally,--.
Line 58, "translucent" should read --translucent,--.

Signed and Sealed this

Third Day of May, 1988

*Attest:*

DONALD J. QUIGG

*Attesting Officer*

*Commissioner of Patents and Trademarks*